United States Patent
Miyatake et al.

(10) Patent No.: US 6,312,813 B1
(45) Date of Patent: Nov. 6, 2001

(54) CATION-ELECTRODEPOSITABLE RESIN COMPOSITION

(75) Inventors: Shinji Miyatake; Hidehiko Haneishi, both of Hiratsuka (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 0 days.

(21) Appl. No.: 09/522,835

(22) Filed: Mar. 10, 2000

(30) Foreign Application Priority Data

Mar. 10, 1999 (JP) .................................................. 11-062516

(51) Int. Cl.$^7$ ...................................................... B32B 15/08
(52) U.S. Cl. .................. 428/418; 204/506; 204/508; 523/410; 523/414; 523/458; 523/459
(58) Field of Search ..................................... 523/402, 404, 523/410, 414, 436, 458, 459; 204/504, 505, 506, 508; 428/418

(56) References Cited

U.S. PATENT DOCUMENTS

| 4,113,791 | 9/1978 | Smith et al. . | |
|---|---|---|---|
| 4,944,855 | * 7/1990 | Schon et al. | 523/404 |
| 5,702,581 | * 12/1997 | Kerlin et al. | 204/486 |

FOREIGN PATENT DOCUMENTS

| 0509437 | 10/1992 | (EP) . |
| 0696624 | 2/1996 | (EP) . |
| 2264504 | * 1/1993 | (GB) . |

* cited by examiner

*Primary Examiner*—Robert Dawson
*Assistant Examiner*—D. Aylward
(74) *Attorney, Agent, or Firm*—Wenderoth, Lind & Ponack, L.L.P.

(57) ABSTRACT

The present invention provides a cationic electrodeposition paint capable of forming a coating film with uniform coating surface and small film thickness difference and excellent in gloss and levelling property, characterized by containing a cationizable resin having crosslinkable functional group (A), a blocked polyisocyanate compound (B) and benzoic acid and/or salicylic acid (C).

15 Claims, No Drawings

CATION-ELECTRODEPOSITABLE RESIN COMPOSITION

The present invention relates to a cation-electrodepositable resin composition capable of forming a coating film with uniform coating surface and small film thickness difference and excellent in gloss and levelling property.

As a cationic electrodeposition paint is excellent in throwing power and forms a coating film excellent in durability, corrosion resistance etc., it is largely adopted for undercoating of metallic substrates such as motorcar body, electric appliances etc., which require such properties. And prior to the electrodeposition coating, it is widely conducted to chemically treat the surface of the substrate with zinc phosphate etc. in order to improve the anticorrosivity, adhesivity etc. of the electrodeposited coating film.

However, this chemically treated coating film often generates treatment marks, which cause uneven coating film thickness and when the surface of such uneven treated coating film is electrodeposition-coated, there generate defects of being prone to generate the film thickness difference of the electrodeposited coating film and the lowering of gloss and levelling property of the coating surface.

The main purpose of the present invention is to provide a cation-electrodepositable resin composition capable of forming a uniform electrodeposited coating film, having very small film thickness difference and excellent in gloss and levelling property on the surface of the chemically treated coating film, even if the thickness of said chemically treated coating film is uneven.

The present inventors conducted an intensive research aiming at achieving the above-mentioned purpose. As a result, this time, they have found out that a cationic electrodeposition paint, capable of forming a coating film, whose coating surface is uniform with very small film thickness difference and excellent in gloss and levelling property, can be obtained by further containing aromatic carboxylic acid in a resin composition for a cationic electrodeposition paint and completed the present invention.

Thus, the present invention provides a cation-electrodepositable resin composition characterized by containing (A) a cationizable resin having crosslinkable functional group, (B) a blocked polyisocyanate compound, and (C) an aromatic carboxylic acid compound selected from benzoic acid, salicylic acid and their mixture.

Then, the cationic electrodeposition paint of the present invention will be described in detail.

Cationizable Resin Having Crosslinkable Functional Group (A)

As the cationizable resin (A) in the present invention, substances used hitherto as base resin in a cationic electrodeposition paint can be used in the same manner and there can be used, for example, resins having crosslinkable functional group such as hydroxyl group and cationizable group such as primary, secondary or tertiary amino group etc. in the molecule and as the resin skeleton there can be mentioned, for example, epoxy resin, acrylic resin, polybutadiene, alkyd resin, polyester resin etc. Above all, a polyamine resin, an epoxy resin added with amine, is generally suitable from a viewpoint of excellent corrosion resistance etc.

As an amine-added epoxy resin there can be mentioned, for example, (i) adducts of polyepoxide compound and primary mono- or polyamine, secondary mono- or polyamine, primary/secondary mixed polyamines etc. (cf. for example, U.S. Pat. No. 3,984,299 Specification); (ii) adducts of polyepoxide compound and secondary mono- or polyamine having ketiminized primary amino group (cf. for example, U.S. Pat. No. 4,017,438 Specification); (iii) products obtained by an etherification reaction between polyepoxide compound and hydroxyl compound having ketiminized primary amino group (cf. for example, Japanese Laid-open Patent Publication No. 43013/1984) etc.

Polyepoxide compound used for the preparation of amineadded epoxy resin is a compound having two or more epoxy groups in the molecule and has suitably in the range of generally at least 200, preferably 400–4000 of number-average molecular weight and generally at least 190, preferably 300–2000 of epoxy equivalent. Particularly substances obtained by reaction of polyphenol compound and epichlorohydrin are preferred. As polyphenol compounds usable for the formation of such polyepoxide compounds there can be mentioned, for example, bis(4-hydroxyphenyl)-2,2-propane, 4,4-dihydroxybenzophenone, bis(4-hydroxyphenyl)-1,1-ethane, bis(4hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4-dihydroxydiphenylsulfone, phenol novolac, cresol novolac etc.

As amines addible to these polyepoxide compounds there can be mentioned, for example, amine compounds such as primary amines, secondary amines, tertiary amines, polyamines etc. As primary amine compounds here there can be mentioned, for example, methylamine, ethylamine, n-propylamine, isopropylamine, monoethanolamine, n-propanolamine, isopropanolamine etc.; as secondary amine compounds there can be mentioned, for example, diethylamine, diethanolamine, di-n-propanolamine, diisopropanolamine, N-methylethanolamine, N-ethylethanolamine etc.; and as tertiary amine compounds there can be mentioned, for example, triethylamine, triethanolamine, N,N-dimethylethanolamine, N-methyldiethanolamine, N,N-diethylethanolamine, N-ethyldiethanolamine etc.; further, as polyamines there can be mentioned, for example, ethylenediamine, diethylenetriamine, hydroxyethylaminoethylamine, ethylaminoethylamine, methylaminopropylamine, dimethylaminoethylamine, dimethylaminopropylamine etc.

Further,it is possible to make a cationizable group by protonizing with acid a basic group formed by reacting epoxy group by using as cationizing agent basic compounds such as ammonia, hydroxylamine, hydrazine, hydroxyetylhydrazine, N-hydroxyethylimidazoline etc. As acids usable in that case, water-soluble organic carboxylic acids, for example, formic acid, acetic acid, glycolic acid, lactic acid etc. are preferred.

Blocked Polyisocyanate Compound (B)

A blocked polyisocyanate compound (B) in the present invention is a substance which acts as a curing agent for the abovementioned base resin, a cationizable resin, and generally a full-block addition reaction product of a polyisocyanate compound can be used.

A polyisocyanate compound is a compound having at least two isocyanate groups in the molecule and there can be mentioned, for example, aromatic, alicyclic or aliphatic polyisocyanate compounds such as tolylene diisocyanate, xylylene diisocyanate, phenylene diisocyanate, bis(isocyanatomethyl)cyclohexane, tetramethylene diisocyanate, hexamethylene diisocyanate, methylene diisocyanate, isophorone diisocyanate etc., and prepolymers with a molecular weight in the range of usually 150–5000 having terminal isocyanate group obtained by reacting excess amount of these polyisocyanate compounds with low molecular active hydrogen-containing compound such as ethylene glycol, propylene glycol, trimethylolpropane, hexanetriol, castor oil etc.

On the other hand, a blocking agent is a compound to add to an isocyanate group of a polyisocyanate compound and to temporarily block it. A blocked polyisocyanate compound formed by addition thereof is stable at normal temperature but when heated at higher temperature than dissociation temperature (for example, over 100° C.), the blocking agent dissociates and the isocyanate group regenerates and crosslinks with a crosslinkable functional group of the cationizable resin (A). As such a blocking agent there can be mentioned, for example, lactam type compounds such as ε-caprolactam, γ-butyrolactam etc.; oxime type compounds such as methyl ethyl ketoxime, cyclohexanone oxime etc.; phenol type compounds such as phenol, p-t-butylphenol, cresol etc.; aliphatic alcohols such as n-butanol, 2-ethylhexanol etc.; aromatic alkyl alcohol type compounds such as phenylcarbitol, methyl phenylcarbitol etc.; ether alcohol type compounds such as ethylene glycol monobutyl ether etc. Among them, oxime type and lactam type blocking agents dissociate at relatively low temperature and are therefore preferred in terms of low temperature curability of the electrodeposition paint etc.

The relative proportion of a cationizable resin (A) and a blocked polyisocyanate compound (B) in the resin composition of the present invention is suitable in the range of generally 50–90%, particularly 65–80%, of the cationizable resin (A) and generally 50–10%, particularly 35–20% based upon the total solid content weight of these two components.

Aromatic Carboxylic Acid Compound (C)

An aromatic carboxylic acid compound (C) is a compounding component characterizing the composition of the present invention and, by containing the aromatic carboxylic acid compound (C) in the resin composition for cationic electrodeposition paint according to the present invention, it is possible to form a coating film whose electrdeposited surface is uniform and with small film thickness difference and excellent in gloss and levelling property, even when the chemically treated coating film thickness on the surface of the substrate is uneven.

As an aromatic carboxylic acid (C), benzoic acid or salicylic acid can be used singly or benzoic acid and salicylic acid can be used in mixture and the mixing ratio in that case is not restricted at all but they can be used in mixing at an optional ratio.

The content of an aromatic carboxylic acid compound (C) in the resin composition of the present invention is suitably in the range of generally 0.1–5 parts by weight, particularly 0.3–3.5 parts by weight, more particularly 0.5–2 parts by weight per 100 parts by weight (solid content) of the total of the catioinizable resin (A) and the blocked polyisocyanate compound (B).

Cation-electrodepositable Resin Composition

The cation-electrodepositable resin composition of the present invention can be prepared, for example, by mixing and dispersing the above-mentioned catioinizable resin (A), blocked polyisocyanate compound (B) and aromatic carboxylic acid compound (C) in an aqueous medium. As a neutralizing agent for cationization by neutralizing a cationizable group in the catioinizable resin (A) in that case there can be mentioned, for example, organic or inorganic acids such as formic acid, acetic acid, lactic acid, methanesulfonic acid, phosphoric acid etc. Such an acid may be already added to the catioinizable resin (A) or may be added in the aqueous medium together with the above-mentioned components (A), (B) and (C) at the time of the above-mentioned mixing and dispersing.

Moreover, the resin composition of the present invention can contain, as necessary, a compound containing metal selected from bismuth, lanthanum and molybdenum; anticorrosive agent such as lead-containing compound; curing catalyst such as organotin compound; pigment; organic solvent; antisettling agent etc.

A compound containing metal selected from bismuth, lanthanum and molybdenum is useful to promote the curability and improve the anticorrosivity of the electrodeposited coating film formed and specifically there can be used the water-soluble or water-insoluble metal-containing compound mentioned below.

As a bismuth-containing compound there can be mentioned, for example, bismuth lactate, bismuth silicate, triphenyl bismuth, bismuth gallate, bismuth hydroxide, bismuth trioxide, bismuth nitrate, bismuth benzoate, bismuth citrate, bismuth oxycarbonate etc. Among them, particularly bismuth lactate, bismuth silicate and bismuth hydroxide are preferred.

As a lanthanum-containing compound there can be mentioned, for example, lanthanum acetate, lanthanum lactate, lanthanum oxalate, lanthanum nitrate, lanthanum hydroxide, lanthanum oxide, lanthanum tungstate etc. Among them, particularly lanthanum organic acid salts such as lanthanum acetate are preferred.

As a molybdenum-containing compound there can be mentioned, for example, zinc molybdate, aluminium molybdate, zinc phosphomolybdate, aluminium phosphomolybdate etc.

Such a metal-containing compound can be used usually in a powder form and its particle diameter is preferable in the range of generally less than 10 $\mu$m, particularly 0.1–3 $\mu$m. Its compounding amount is suitable in the range of generally 0.1–10 parts by weight, particularly 0.3–7 parts by weight, more particularly 0.5–5 parts by weight as metal amount per 100 parts by weight (solid content) of the total of the catioinizable resin (A) and blocked polyisocyanate compound (B).

As a lead-containing compound used as anticorrosive agent there can be mentioned, for example, lead silicate, lead acetate etc. and as an organotin compound there can be mentioned, for example, dioctyltin benzoate, dibutyltin benzoate, dibutyltin oxide, dioctyltin oxide, dibutyltin dilaurate, dioctyltin dilaurate, dibutyltin diacetate etc.

As a pigment, substances generally used in the field of paint can be used in the same manner and include inorganic and organic color pigments,for example, titanium white, zinc white, carbon black, molybdate orange, iron oxide red, naphthol type, pyrazolone type, benzoimidazolone type, anthraquinone type, thioindigo type, perylene type, quinacridone type, titanium yellow, monoazo type, disazo type, condensed azo type, anthrapyrimidine type, cobalt green, phthalocyanine green, ultramarine blue, cobalt blue, phthalocyanine blue, cobalt violet etc.; extender pigments such as calcium carbonate, kaolin, clay, diatomaceous earth, hydrous silicic acid, talc, barite, barium sulfate, barium carbonate, silica sand, glass beeds, mica etc.; anticorrosive pigments such as zinc powder, zinc phosphate, calcium phosphate, aluminium phosphate, aluminium polyphosphates such as aluminium tripolyphosphate, aluminium orthophosphate, calcium orthophosphate, boric acid type anticorrosive pigments, anticorrosive pigments such as alkaline earth metal and zinc oxide, tungstic acid type anticorrosive pigments, phosphorous acid type anticorrosive pigments, hypophosphorous acid type anticorrosive pigments, nitrouos acid type anticorrosive pigments, vanadic acid type anticorrosive pigments etc. Further, compounds such as $Zr(OH)_4$, $Mg_4Al_2(OH)_{12}CO_3 \cdot 3H_2O$, $Mg_6Al_2(OH)_{16}CO_3 \cdot 5H_2O$, $Mg_6Al_7(OH)_{16}CO_3 \cdot 4H_2O$ etc. can be used as anticorrosive pigment.

Such a pigment preferably has particle diameter of generally less than 10 μm, particularly in the range of 0.01–3 μm. Its compounding amount can be optionally selected according to the purpose but is suitable in the range of usually 0.5–50 parts by weight, particularly 1–30 parts by weight per 100 parts by weight (solid content) of the total solid content of the catioinizable resin (A) and blocked polyisocyanate compound (B).

The resin composition of the present invention is cation-electrodepositable and can be favorably used as cationic electrodeposition paint for preparation of an electrodeposition bath and for electrodeposition coating of a substrate such as motorcar body, electric appliances etc. For example, electrodeposition coating can be conducted by preparing an electrodeposition bath by diluting the resin composition of the present invention with deionized water etc. so that the solid content would be about 5–40% by weight and adjusting its pH to 5.5–9.0, dipping the substrate therein as cathode, and passing the current under the condition of bath temperature 15–35° C., load voltage 100–400V. Coating film thickness can be varied according to the purpose of the substrate but is preferable in the range of generally 10–40 μm as a cured coating film. The coating film can be cured by heating the substrate, after being drawn out from the electrodeposition bath and washed with water after passing the current, at about 100–about 200° C., preferably at about 140–about 180° C. for 10–40 minutes.

As mentioned above, a remarkable effect is achieved that the cationically electrodeposited coating film formed by using the resin composition of the present invention has, even if the thickness of the coating film formed on the surface of the substrate by a chemical treatment is uneven, the constant film thickness of the cationic electrodeposition paint according to the present invention formed on its surface, the variation of the film thickness does not almost exist and the coating film is excellent in gloss, levelling property etc.

Then, the present invention will be described more specifically by quoting examples and comparative examples. The scope of the persent invention, however, is not restricted only in these examples at all. Parts and % are based on weight in principle and the film thickness of the coating film is based upon a cured coating film.

COMPARATIVE EXAMPLE 1

1900 Parts of "Epon 1004" (made by Yuka Shell Kabushiki Kaisha, trade name, bisphenol A type epoxy resin, epoxy equivalent about 950) were dissolved in 1012 parts of butyl cellosolve and, after heating to 80–100° C., 124 parts of diethylamine were added drop by drop and then kept at 120° C. for 2 hours to obtain an amine-added epoxy resin of amine value 47. On the other hand, 1000 parts of a dimer acid type polyamide resin of amine value 100 ("Versamid 460", made by Henkel Hakusui Corporation, trade name) were dissolved in 429 parts of methyl isobutyl ketone, refluxed at 130–150° C. while distilling off the generated water, and the product, in which the terminal amino group of said amide resin was converted into ketimine, was kept at 150° C. for about 3 hours and, after distilling of water was terminated, cooled to 60° C. Then this product was added to the above-mentioned amine-added epoxy resin and heated to 100° C., kept for 1 hour and then cooled to room temperature to obtain a varnish (a) of an amine-added-epoxy resin-polyamide-modified resin of solid content 68% and amine value 65.

103 Parts (70 parts as resin solid content) of the varnish (a), 30 parts (solid content) of 2-ethylhexyl alcohol-blocked tolylene diisocyanate, 15 parts of 10% aqueous solution of acetic acid and 72.5 parts of pigment paste (*1) were mixed and a cationic electrodeposition paint for comparison of solid content 20% was obtained by further addition of water.

(*1) Pigment paste: a paste obtained by adding 10 parts of titanium oxide pigment, 0.5 parts of carbon black, 20 parts of clay, 20 parts of 10% aqueous solution of bismuth lactate and 35 parts of water to 5 parts (solid content) of the above-mentioned varnish (a) and by mixing and dispersing them.

EXAMPLE 1

1 Part of benzoic acid was added to the electrodeposition paint of Comparative Example 1 per 100 parts of the total solid content of the varnish (a) and 2-ethylhexyl alcohol-blocked tolylene disisocyanate to prepare a cationic electrodeposition paint according to the present invention.

EXAMPLE 2

1 Part of salicylic acid was added to the electrodeposition paint of Comparative Example 1 per 100 parts of the total solid content of the varnish (a) and 2-ethylhexyl alcohol-blocked tolylene diisocyanate to prepare a cationic electrodeposition paint according to the present invention.

COMPARATIVE EXAMPLE 2

A cationic electrodeposition paint was prepared in the same manner as Example 1, except that benzoic acid in Example 1 was replaced by the same amount of oleic acid.

COMPARATIVE EXAMPLE 3

A cationic electrodeposition paint was prepared in the same manner as Example 1, except that benzoic acid in Example 1 was replaced by the same amount of linolic acid.

COMPARATIVE EXAMPLE 4

A cationic electrodeposition paint was prepared in the same manner as Example 1, except that benzoic acid in Example 1 was replaced by the same amount of decanoic acid.

COMPARATIVE EXAMPLE 5

A cationic electrodeposition paint was prepared in the same manner as Example 1, except that benzoic acid in Example 1 was replaced by the same amount of stearic acid.

Performance Test

Zinc phosphate-treated steel plate (*2) was dipped as cathode in the cationic electrodeposition paint obtained in the above-mentioned Examples and Comparative Examples and the electrodeposition coating was conducted by passing current at 30° C., 200 V for 3 minutes. After that the plate was drawn out, washed with water and heated at 170° C. for 20 minutes to cure the coating film. The formed electrodeposited coating surface was evaluated. The film thickness of the cationically electrodeposited coating film was about 20 μm. The results are shown in Table 1.

(*2) Zinc phosphate-treated steel plate: Steel plate whose surface was treated with zinc phosphate, (size 100×150×0.8 mm). Such plates that treatment marks of treating solution were observed on the treated coating film, were selected as substrates to be used for performance test.

TABLE 1

|  | Film thickness difference | Gloss | Levelling property |
|---|---|---|---|
| Example 1 | 3 | 80 | ○ |
| Example 2 | 4 | 80 | ○ |
| Comparative Example 1 | 10 | 50 | X |
| Comparative Example 2 | 11 | 57 | X |
| Comparative Example 3 | 8 | 76 | Δ |
| Comparative Example 4 | 8 | 73 | Δ |
| Comparative Example 5 | 9 | 60 | X |

The test methods used for obtaining the results shown in the above-mentioned Table 1 are as follows.

Film thickness difference:

The difference between the maximum film thickness and the minimum film thickness (μm) on the coated steel plate measured by using PERMASCOPES TYPE ES8e3KB4, made by HELMUT FISCHER GMBH & Co.

Gloss:

60-Degree specular reflection rate (%) measured by using GLOSS METER MODEL GM-26D, made by MURAKAMI COLOR RESEARCH LABORATORY.

Levelling property:

Evaluated by visual observation. ○ shows good levelling property, Δ shows that the levelling property is a little inferior, × shows that the levelling property is very inferior.

What is claimed is:

1. A cation-electrodepositable resin composition comprising (A) a cationizable resin having at least one crosslinkable functional group, (B) a blocked polyisocyanate compound, and (C) an aromatic carboxylic acid compound selected from benzoic acid, salicylic acid and their mixture, said composition being prepared by mixing the cationizable resin (A) and the blocked polyisocyanate compound (B) with the aromatic carboxylic acid compound (C).

2. The composition set forth in claim 1 wherein the cationizable resin (A) is a resin having hydroxyl group and primary, secondary or tertiary amino group in the molecule.

3. The composition set forth in claim 1 wherein the cationizable resin (A) is an amine-added epoxy resin.

4. The composition set forth in claim 1 wherein the blocked polyisocyanate compound (B) is a full-block addition reaction product of a polyisocyanate compound selected from the group consisting of tolylene diisocyanate, xylylene diisocyanate, phenylene diisocyanate, bis(isocyanatomethyl)cyclohexane, tetramethylene diisocyanate, hexamethylene diisocyanate, methylene diisocyanate, isophorone diisocyanate and isocyanate-terminal prepolymers derived from these polyisocyanate compounds.

5. The composition set forth in claim 1 wherein the blocked polyisocyanate compound (B) is blocked with an oxime type or lactam type blocking agent.

6. The composition set forth in claim 1 wherein the relative proportion of a cationizable resin (A) and a blocked polyisocyanate compound (B) is in the range of 50–90% of the cationizable resin (A) and 50–10% of the blocked polyisocyanate compound (B) based upon the total solid content weight of these two components.

7. The composition set forth in claim 1 wherein the relative proportion of a cationizable resin (A) and a blocked polyisocyanate compound (B) is in the range of 65–80% of the cationizable resin (A) and 35–20% of the blocked polyisocyanate compound (B) based upon the total solid content weight of these two components.

8. The composition set forth in claim 1 containing an aromatic carboxylic acid compound (C) in the range of 0.1–5 parts by weight per 100 parts by weight of the total solid content of the cationizable resin (A) and the blocked polyisocyanate compound (B).

9. The composition set forth in claim 1 containing an aromatic carboxylic acid compound (C) in the range of 0.3–3.5 parts by weight per 100 parts by weight of the total solid content of the cationizable resin (A) and the blocked polyisocyanate compound (B).

10. The composition set forth in claim 1 further containing a compound containing metal selected from bismuth, lanthanum and molybdenum; anticorrosive agent; curing catalyst; pigment; organic solvent or antisettling agent.

11. The composition set forth in claim 10 further containing a compound containing metal selected from bismuth, lanthanum and molybdenum in the amount of 0.1–10 parts by weight as metal amount per 100 parts by weight of the total solid content of the cationizable resin (A) and the blocked polyisocyanate compound (B).

12. A cationic electrodeposition paint comprising the resin composition set forth in claim 1.

13. A cationic electrodeposition bath comprising the resin composition set forth in claim 1.

14. A cationic electrodeposition coating method characterized by using the resin composition set forth in claim 1.

15. An article coated by using the resin composition set forth in claim 1.

* * * * *